US008034226B2

(12) United States Patent
Pham et al.

(10) Patent No.: US 8,034,226 B2
(45) Date of Patent: Oct. 11, 2011

(54) DEVICE FOR DIELECTROPHORETIC SEPARATION OF PARTICLES CONTAINED IN A FLUID

(75) Inventors: Pascale Pham, Crolles (FR); François Perraut, Saint Joseph de Riviere (FR); Adrien Plecis, Bourg la Reine (FR)

(73) Assignee: Commissariat a l'Energie Atomique, Paris (FR)

( * ) Notice: Subject to any disclaimer, the term of this patent is extended or adjusted under 35 U.S.C. 154(b) by 226 days.

(21) Appl. No.: 11/576,211

(22) PCT Filed: Sep. 15, 2005

(86) PCT No.: PCT/FR2005/050745

§ 371 (c)(1), (2), (4) Date: Jul. 25, 2007

(87) PCT Pub. No.: WO2006/037910

PCT Pub. Date: Apr. 13, 2006

(65) Prior Publication Data

US 2008/0011608 A1 Jan. 17, 2008

(30) Foreign Application Priority Data

Oct. 4, 2004 (FR) ...................................... 04 10443

(51) Int. Cl.
*G01N 27/26* (2006.01)
*G01N 27/447* (2006.01)

(52) U.S. Cl. ......................... 204/643; 204/547; 204/672

(58) Field of Classification Search .................. 204/643, 204/547, 670, 660, 647, 671, 672
See application file for complete search history.

(56) References Cited

U.S. PATENT DOCUMENTS

| | | | | |
|---|---|---|---|---|
| 3,162,592 | A | 12/1964 | Pohl | |
| 5,993,630 | A * | 11/1999 | Becker et al. | 204/547 |
| 6,203,683 | B1 * | 3/2001 | Austin et al. | 204/547 |
| 6,610,188 | B1 | 8/2003 | Fuhr et al. | |
| 7,070,684 | B1 | 7/2006 | Fuhr et al. | |
| 7,153,648 | B2 * | 12/2006 | Jing et al. | 435/2 |
| 2004/0112748 | A1 | 6/2004 | Lee et al. | |
| 2004/0226819 | A1 * | 11/2004 | Talary et al. | 204/451 |

FOREIGN PATENT DOCUMENTS

WO WO 00/00293 A1 1/2000

OTHER PUBLICATIONS

Choi et al. (Microfluidic system for dielectrophoretic separation based on a trapezoidal electrode array, Lab Chip 2005, 5, 1161-1167).*
Muller et al. (Electrophoresis 2003, 24, 722-731).*

* cited by examiner

*Primary Examiner* — Jeffrey T Barton
*Assistant Examiner* — Jennifer Dieterle
(74) *Attorney, Agent, or Firm* — Heslin Rothenberg Farley & Mesiti P.C.

(57) ABSTRACT

A device for dielectrophoretic separation of particles contained in a fluid, includes two sets of electrodes, each of the two sets of electrodes being brought to a different potential, so as to generate an electric field inside said fluid. The two sets of electrodes are positioned inside a chamber, itself provided with a particle collecting surface. Each of the two sets of electrodes is immersed in the fluid inside the chamber and is located in a plane different from the plane of the particle collecting surface. The two sets of electrodes are supplied with electrical current in phase opposition. The potential of each of the two sets of electrodes have a gradient based on the distance along a direction perpendicular to the plane of the particle collecting surface.

16 Claims, 5 Drawing Sheets

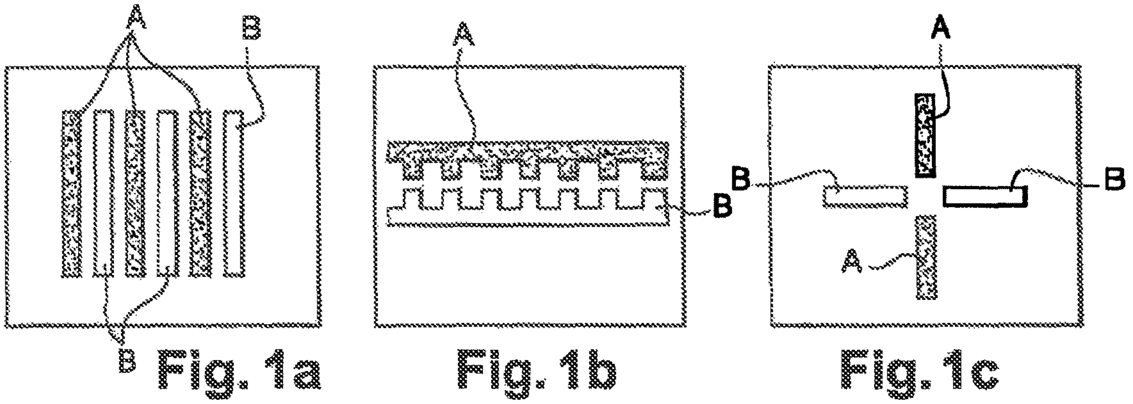
Fig. 1a
(PRIOR ART)
Fig. 1b
(PRIOR ART)
Fig. 1c
(PRIOR ART)
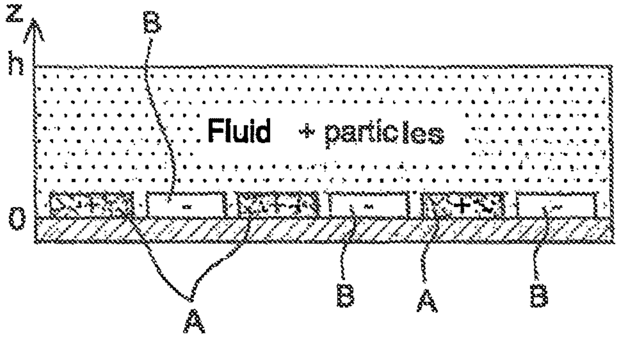
Fig. 2
(PRIOR ART)
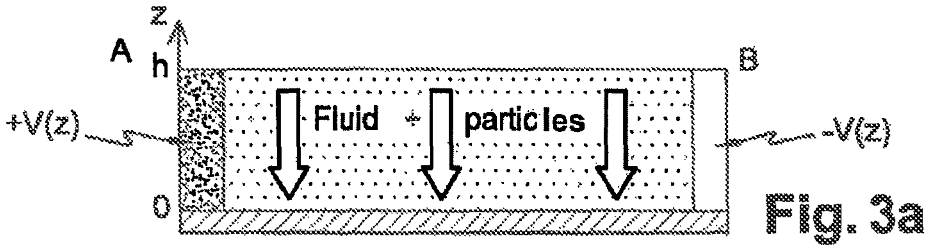
Fig. 3a
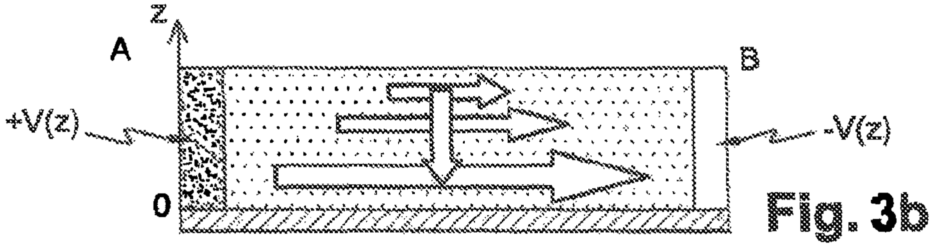
Fig. 3b

DEVICE FOR DIELECTROPHORETIC SEPARATION OF PARTICLES CONTAINED IN A FLUID

CROSS REFERENCE TO RELATED APPLICATIONS

This application is a 371 filing of international application PCT/FR2005/050745, filed on Sep. 15, 2005 and published, in French, as international publication WO 2006/037910 on Apr. 13, 2006, and claims priority of French Application No. 0410443 filed on Oct. 4, 2004, which applications are hereby incorporated by reference herein, in their entirety.

FIELD OF THE INVENTION

The invention relates to a device for dielectrophoretic separation of a fluid, especially a liquid, in order, in particular, to enable isolation or collection of particles, in the widest sense of the term, contained in such a fluid.

DESCRIPTION OF THE PRIOR ART

Various technologies intended to allow separation of mixtures of physical substances for various purposes are currently known. These technologies have evolved, thus allowing the manipulation of objects having extremely small dimensions, and therefore requiring the absence of any contact between said particles and the means used to separate them.

The objects in question in the present invention are relevant to various technical fields. Thus, in biology, these particles consist, not exclusively, of biological cells such as bacteria (several dozen micrometres) and/or biomolecules (DNA, enzymes, proteins, liposomes, etc.) having sizes as small as several tens of nanometres or even just a few nanometres.

In chemistry, these objects may consist of molecules or molecular clusters (micelles).

Generally speaking, these objects may consist of solid particles in a liquid medium (suspension), colloids or even aerosols.

In the rest of this description, these various types of objects will be referred to using the generic term “particles”.

Many technological and industrial applications aim precisely to isolate these particles which are capable of moving in a fluid, especially in a liquid, for analysis, screening, counting, etc.

By way of example, one might mention the field of biosecurity, sanitary controls, agri-food quality inspections, research for new drugs. One might also mention applications that use microcapsules and microspheres (paints, cosmetics, foodstuff industry), aerosols (atmospheric pollution), etc.

Among various technologies for displacing one or more particles in a fluid, one might mention:

- convection: the principle is based on the entrainment of particles by the actual fluid and therefore requires moving the fluid. Controlling the movement of particles therefore makes it necessary to control the movement of the fluid;
- exploiting the physical properties of particles, especially:
  - magnetic properties: magnetophoresis. Applying a magnetic field makes it possible to ensure control of their displacement;
  - electrical properties:
    - electrophoresis: applying an electric field to a charged particle causes creation of a so-called Coulomb force. The electrically charged particle moves parallel to the electric field in a direction that depends on the sign of its electric charge.
    - dielectrophoresis: this technology uses an electric field gradient which has an effect on any charged or non-charged material that has dielectric properties. Such an electric field gradient therefore assumes that the field is not uniform. The particles polarised due to the effect of the electric field move either towards those areas where the electric field is stronger, in this case the term “positive dielectrophoresis” is used, or towards those areas where the electric field is weaker, in this case the term “negative dielectrophoresis” is used, depending upon whether the particles are more or less easily polarisable compared with the fluid in which they are immersed.

The use of dielectrophoresis in the context of the separation of materials is described, for example, in Document U.S. Pat. No. 3,162,592. This dielectrophoresis phenomenon has a certain number of advantages that justify its use in the context of separating materials.

Firstly, it makes it possible to manipulate neutral material, i.e. material having a residual electric charge of zero or close to zero.

In addition, it makes it possible to work with alternating electric fields. In fact, because the applied electric field is not uniform, polarisation reverses with the direction of the field but the dielectrophoretic force remains oriented in the same direction.

In other words, the particles subjected to the electric field gradient do not “see” any change in the sign of the applied electric field. This being so, it is possible to move a particle that can be polarised by dielectrophoresis using an alternating signal.

Consequently, this eliminates the disadvantages associated with electrophoresis. In fact, the reader is reminded that, with electrophoresis, reversal of the electric field causes reversal of the applied Coulomb force so that a charged particle will oscillate around its equilibrium position and, in overall terms, will not be moved.

In addition, using an alternating electric field makes it possible to reduce or even eliminate parasitic electrochemical reactions that are likely to occur, especially at the level of the electrodes in electrical systems using a liquid ionic solution. Attempts are made to overcome these phenomena in so far as they generally cause release of gases from the electrodes and also locally modify the chemical characteristics of media.

Since the phenomenon of dielectrophoresis was first described, the miniaturisation of systems has made it possible to obtain electric fields that are sufficiently intense to envisage using this phenomenon on submicron or even nanometric particles. In fact, it has been demonstrated that the dielectrophoretic force is proportional to the volume of the particle. Therefore, the smaller the particle, the more the intensity of the electric field has to be increased in order to move the particle by dielectrophoresis.

Traditionally, electrodes that produce an electric field gradient are deposited on a flat surface (glass, passivated silicon, etc.) thus resulting in systems with a planar configuration. In such systems, the fluid and particles that the fluid contains are in contact with the upper plane of the electrodes.

The most commonly encountered types of electrodes are interdigitated electrodes, crenelated electrodes and quadrupole electrodes (see FIGS. 1_a_, 1_b_, 1_c_ respectively). FIG. 2 also shows a cross-section of a planar configuration with interdigitated electrodes.

However, planar configurations have a certain number of major drawbacks, as described below.

Firstly, in such a planar configuration, the dielectrophoretic force $F_{DEP}$ has a short range in the direction perpendicular to the plane of the electrodes, i.e. in the volume of fluid containing the particles (oz axis in the Figures). Thus, in the case of interdigitated systems using positive dielectrophoresis, the force reaches its maximum value when there is contact with the sharp edge of the electrode.

In contrast, its intensity decreases exponentially as one moves away from the electrode in direction oz, i.e. in the plane perpendicular to the plane of the electrodes, in accordance with the equation:

$$F_{DEP} \alpha \frac{V_0^2}{d^3} \cdot e^{-3.1412z/d}$$

where d is the distance between the centre of the space that separates two adjacent electrodes and the centre of the electrode, $V_0$ is the peak amplitude of the voltage applied to the electrode and z denotes the distance along the oz axis that separates measurement of the force relative to the plane of the electrodes.

It is apparent that the sharp edge of the electrode creates a corner effect where the electric field is at its maximum. It has also been demonstrated that the range of the dielectrophoretic force along direction oz is effective in an area having a radius equal to approximately 40% of parameter d, i.e. the distance between the center of the inter-electrode gap and the center of the electrode in question.

The collection of particles due to the effect of dielectrophoretic forces is effective in terms of volume if the dimension h of the fluid located above the electrodes is of the same order of magnitude as the pattern d of the electrodes. In other words, this effectiveness is relatively limited or makes it necessary to work with very limited volumes of fluid that are to be treated.

In order to overcome this drawback which will tend to rule out use of this method when one wants to treat large depths of fluid, one might envisage increasing the surface area of the electrodes significantly. However, this solution would completely hamper detection because it becomes more difficult to implement and slower as the surface area of the sensor increases.

Another of the major drawbacks of systems with a planar configuration is the fact that the electrical nature of the particle-fluid pair may render collection inefficient because of a negative dielectrophoresis regime.

In such a configuration, total prevention of collection of said particles by the electrodes can be observed. In fact, if the electrodes are supplied with an alternating or direct electrical signal, there can be two types of dielectrophoresis regime: so-called positive dielectrophoresis whereby the dielectrophoretic forces are oriented in the direction of those areas where the intensity of the electric field is high and therefore in the direction of the electrodes, and negative dielectrophoresis whereby the dielectrophoretic forces are oriented in the direction of those areas where the value of the electric field is low, and therefore in a direction opposite to that of said electrodes.

The direction of the dielectrophoretic force produced by planar electrodes depends, firstly, on the frequency of the electrical signal applied to the electrodes, but also on parameters that are not dependent on the actual electric power supply, namely the electrical properties of the particle-fluid pair. It has been demonstrated, in particular, that the influence of the electric conductivity of the fluid that carries the particles on the dielectrophoresis regime is especially significant.

Thus, a component designed to collect particles by dielectrophoretic attraction is ineffective if the electrical conditions and, in particular, the nature of the particle-fluid pair, make the dielectrophoresis regime always negative. For instance, a fluid that is excessively conductive can make a component with a planar configuration incapable of even the slightest collection on its electrodes. This kind of problem is commonly encountered in biology where the liquids are generally aqueous ionic solutions which are therefore highly conductive.

In fact, in systems with a planar configuration, dielectrophoretic forces may be inhibited by competing forces that also originate from the applied electric field, especially electroconvection. The term “electroconvection” is taken to mean all phenomena tending to move the fluid (convection due to the presence of an electric field applied to the fluid) and especially movement due to electro-osmosis (presence of charges on the electrodes) and movement caused by Joule-effect heating (presence of an electric current in the fluid).

The moving fluid entrains the particles because of their small size; this convection movement is then superimposed on dielectrophoretic movement which may sometimes be completely suppressed if the accumulation areas associated with each phenomenon are not the same.

Electroconvection is an unwanted phenomenon that is found in particular in systems with a planar configuration where entrainment by electroconvection is generally in opposition to dielectrophoretic forces; for instance, in systems with interdigitated electrodes, electroconvection causes the formation of accumulation areas located in the middle of the electrodes and/or in the centre of the inter-electrode gap which are not located in the same position as those due to dielectrophoresis and constituted by the sharp edge of said electrodes, as stated earlier.

This electroconvection is a phenomenon that depends on the frequency of the electric power of the electrodes and becomes increasingly important, the smaller the particles are.

Generally speaking, this phenomenon diminishes with rising frequency, whereas positive dielectrophoresis makes it necessary not to operate above the cutoff frequency that is equivalent to the frequency that corresponds to change from a positive dielectrophoresis regime to a negative dielectrophoresis regime.

In other words, it is therefore not always possible to overcome electroconvection by altering the frequency.

Other types of configurations than the planar configuration previously described have been proposed. Thus, Document US 2004/0011650 proposes a system for confining DNA molecules by using a device making it possible, in particular, to produce electric field gradients, and therefore dielectrophoretic forces, in openings made in an insulating membrane made of quartz in this case and located between two electrodes. The openings force the field lines of the electric field to tighten, thereby creating the desired gradient. The openings therefore constitute collecting areas. Nevertheless, it is observed that the dielectrophoretic forces remain localised in the vicinity of the openings in the membrane and this does not therefore make it possible to obtain a force field distributed throughout the entire volume of the fluid. In addition, this system cannot be used to collect particles using a negative dielectrophoresis regime.

SUMMARY OF THE INVENTION

The object of the present invention is therefore to separate particles in a fluid by dielectrophoresis, overcoming all this method’s various drawbacks.

Fundamentally, it aims to replace a planar configuration of the same type as those previously described, regardless whether they are interdigitated, crenelated or quadrupole configurations, by using a structure with an overall pyramidal shape in which the electrodes producing the dielectrophoresis phenomenon no longer constitute the particle collecting area.

The device according to the invention for dielectrophoretic separation comprises two sets of electrodes, each of the two sets of electrodes being brought to a different potential, so as to generate an electric field inside said fluid, the two sets of electrodes being positioned inside a chamber or pipe accommodating the fluid subjected to dielectrophoretic separation, said chamber itself being provided with a particle collecting surface.

This device is characterised:

in that each of the two sets of electrode is immersed in the fluid inside the chamber or pipe and is located in a plane different from the plane of the particle collecting surface;

in that the two sets of electrodes are supplied with electric current in phase opposition;

in that the potential of each of the two sets of electrode has a gradient based on the distance along the direction perpendicular to the plane of the particle collecting surface.

In other words, the invention involves:

positioning the two sets or types of electrodes in direction oz, the two sets being supplied in phase opposition;

making each of the sets of electrodes capable of delivering a variable electric potential in this direction oz;

and, finally, imposing a potential profile so that the resulting dielectrophoretic force is always oriented in direction oz.

In other words and as already stated, the electrodes lose their collecting-surface role and only have an electrical role, namely providing a non-uniform electric field in order to produce effective dielectrophoretic forces for collection that are directed towards the collecting surface and therefore towards the bottom of the chamber or pipe.

Advantageously, both types of electrodes are supplied with alternating electric current.

BRIEF DESCRIPTION OF THE DRAWINGS

The manner in which the invention can be implemented and its resulting advantages will become more apparent from the examples of embodiments given below, merely by way of example, reference being made to the accompanying drawings.

FIGS. 1*a*, 1*b* and 1*c* are schematic top views of three planar electrode configurations according to the prior art; interdigitated, crenelated and quadrupole respectively.

FIG. 2 is a schematic cross-sectional view of the electrodes in FIG. 1*a*.

FIGS. 3*a* and 3*b* schematically show the general underlying principle of the invention.

DESCRIPTION OF THE PREFERRED EMBODIMENTS

One of the objectives of the invention is to obtain, firstly, a dielectrophoretic force parallel to the oz axis, i.e. perpendicular to the collecting plane, and, secondly, distributed in a controlled fashion along oz. For example, the intensity of the dielectrophoretic force may be substantially constant along the oz axis.

To achieve this and taking into account known dielectrophoresis phenomena, there is a need to create an electric field modulus $\vec{\nabla}E^2$ oriented along the oz axis which means that electric field $\vec{E}$ must be perpendicular to the two sets of electrodes.

In order to achieve this result, one uses a variable potential profile applied to each of the sets of electrodes in the various possible configurations. FIGS. 3*a* and 3*b* schematically show the general operating principle of the device according to the invention.

Firstly, it should be emphasised that the positioning of each of the two sets of electrodes along the oz axis, i.e. in a direction perpendicular to the collecting plane, no longer limits the range of the dielectrophoretic force in this direction.

In fact, the distribution of this force along the oz axis is a direct consequence of the height h of the two sets of electrodes in this direction oz, besides the shape of the electric potential V(z) imposed on these two sets.

Figure 4:
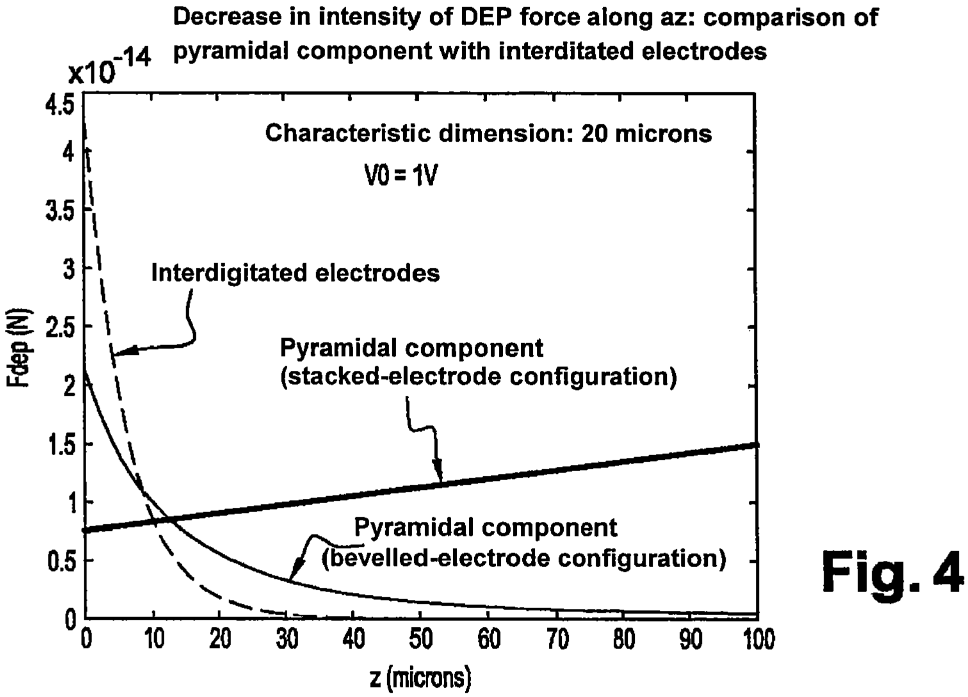
FIG. 4 is a graph showing the relative variation in dielectrophoretic force as a function of its measurement distance relative to the collecting surface, for an interdigitated configuration, for a bevelled-electrode configuration and for a stacked-electrode configuration respectively.

FIG. 4 represents the variation in the dielectrophoretic force along the oz axis for three different configurations:

interdigitated electrodes according to the prior art;

a pyramidal-type configuration with stacked electrodes;

a pyramidal-type configuration with bevelled electrodes.

The two above-mentioned pyramidal-type configurations in accordance with the invention will be described in greater detail below.

As mentioned in relation to the description of the drawbacks associated with configurations according to the prior art, one can observe a very rapid decrease in the effective range of the dielectrophoretic force along the oz axis with interdigitated electrodes.

In contrast, it is apparent that this decrease is much slower for a pyramidal-type configuration with bevelled electrodes in accordance with the invention. In addition, with the stacked-electrode configuration, the intensity of the force increases substantially linearly as one moves away from the collecting surface (i.e. for z=0). More generally speaking, by controlling the profile of the applied potential, it will be possible to control the intensity of the force.

The drawback associated with planar configurations and, especially, interdigitated configurations (exponential decrease in intensity of the dielectrophoretic force) is therefore eliminated or, at least, largely reduced.

Moreover, it must be stressed that, because, according to the invention, the electrodes no longer constitute a surface for collecting the particles to be separated, the dimensions of said electrodes are therefore no longer a limiting factor during the reading stage and their size can be adapted to suit the volume of fluid to be treated.

According to another aspect of the invention, the device can operate both with positive dielectrophoresis as well as with negative dielectrophoresis, thus making it possible to increase the application areas of the present invention significantly. In fact, it is possible to impose a non-constant potential profile V(z) on each of the two sets of electrodes A and B, thereby providing an additional degree of freedom for controlling the dielectrophoresis phenomenon.

Thus, the +oz or −oz orientation of the dielectrophoretic forces is controlled depending on the shape of potential V(z) and, consequently, the effectiveness of the device according to the invention no longer depends on the type of dielectrophoresis regime. In this respect, the reader is reminded that the above-mentioned planar configurations necessarily require a positive dielectrophoresis regime in order to obtain collection on a solid surface.

In a first case, for example with a positive dielectrophoresis regime and for a fixed collecting surface, potential V(z) will decrease with oz and be applicable to a predetermined particle-fluid combination with an electrode signal frequency that is also predetermined.

In contrast, with another particle-fluid combination or another signal frequency, one can achieve a negative dielectrophoresis regime, this time by increasing potential V(z) that intervenes at the level of each of the two sets of electrodes with oz in order to obtain collection on the same surface as previously.

In other words, signal V(z) is reversed relative to the previous configuration in order to maintain a dielectrophoretic force that remains oriented in the direction of the collecting surface, especially if the fluid becomes highly conductive or if one wants to work at another frequency.

Structurally speaking, in the context of the electrode configuration according to the invention, the electrodes no longer constitute a collecting surface. This being so, this configuration is no longer limited by electroconvection which may even become a phenomenon that favours dielectrophoresis to the extent that it no longer prevents the collection of particles by dielectrophoresis but, on the contrary, encourages it. Convection actually helps mix the fluid above the capture or collecting surface, thereby increasing the probability that the particles which the fluid contains will move onto this collecting surface.

Among the other advantages inherent in the particular configuration of the two sets of electrodes according to the invention, one should also underline the advantage that is directly inherent in the separation of collection functions and electrical functions because it becomes possible to envisage using controlled reading protocols on non-electric surfaces. In particular, molecule immobilisation techniques are well controlled on glass, silicon dioxide, silicon or plastic materials whereas this is not the case on conductive metal surfaces.

According to the invention, the pyramidal device can have three possible configurations which correspond to three types of electrodes that make up the sets:

- stacked electrodes;
- bevelled electrodes;
- and insulated electrodes.

These three configurations make it possible to eliminate the drawbacks associated with interdigitated systems and, more generally speaking, systems with a planar configuration. Although the performance of these three types of electrodes are not equal, the advantages associated with the pyramidal structure that they use and mentioned previously are preserved. The type of electrode chosen in the separating device depends on the performance targets to be achieved as well as the available fabrication techniques.

It should be mentioned that microelectronic techniques already used to produce planar systems can be retained in order to produce these electrodes. They can be assembled in a macrosystem that contains the collecting surface and which must fulfil all the other non-electrical functions (leaktightness, fluid supply, connection to a reading system, etc.) associated with the component, depending on the way it is used (capture, separation, screening, etc). They can also be produced in a microsystem.

Bevelled-Electrode Configuration

In order to provide a dielectrophoretic force parallel to the oz axis and as uniform as possible, it has already been shown that it is necessary to impose a potential V(z) that varies along oz to each of the sets of electrodes A and B (see FIG. 3). Due to their metallic, highly conductive nature, the electrodes have a potential that is uniformly distributed over their surface if they are connected to a voltage generator. Thus a planar electrode having a surface that is parallel to the oz axis produces a potential that is constant along oz.

In contrast, an electrode having a surface that is not parallel to the oz axis will produce a potential V(z) that varies over the plane that is parallel to oz.

Figure 5:
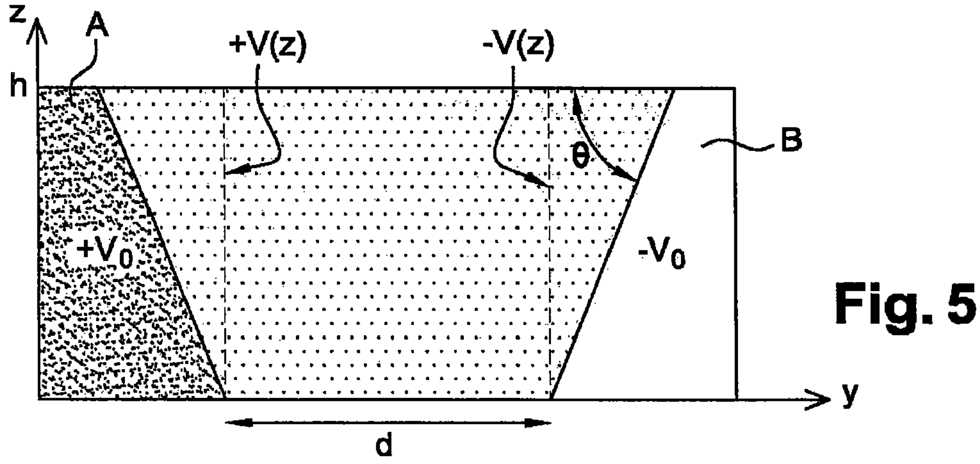
FIG. 5 is a schematic view showing the invention with the bevelled-electrode configuration according to the invention.

In order to achieve such a configuration, the invention recommends, according to a so-called "bevelled-electrode" embodiment shown in FIG. 5, that the sets of electrodes A and B each consist of a single electrode supplied at a potential having a peak value $V_0$, the respective surface of which that is in contact with the fluid being inclined at an angle q relative to horizontal, thereby giving them a bevelled appearance. In other words, the electrodes have a rectangular trapezoidal longitudinal cross-section, the inclined surface of which is in contact with the fluid.

Angle θ depends on the volume of fluid to be treated and the nature of the particular particle-fluid pair: it must be $0 \leqq \theta < 90°$.

For any value of θ in the range thus defined, there is a corresponding potential $V_0$ that makes it possible to obtain a dielectrophoretic force capable of moving the particles. The bigger angle θ is (without exceeding 90°), the higher the intensity of the dielectrophoretic force.

The condition θ=90° must not be reached because it corresponds to a situation where the surface area of the electrode in contact with the fluid is parallel to oz which cancels the variation in potential V with z, and thus the dielectrophoretic force as shown previously.

The condition θ=0 can be envisaged because it corresponds to an interdigitated system: the intensity of the force is limited along oz but nevertheless remains effective on the sharp edges of the electrodes.

Figure 6:
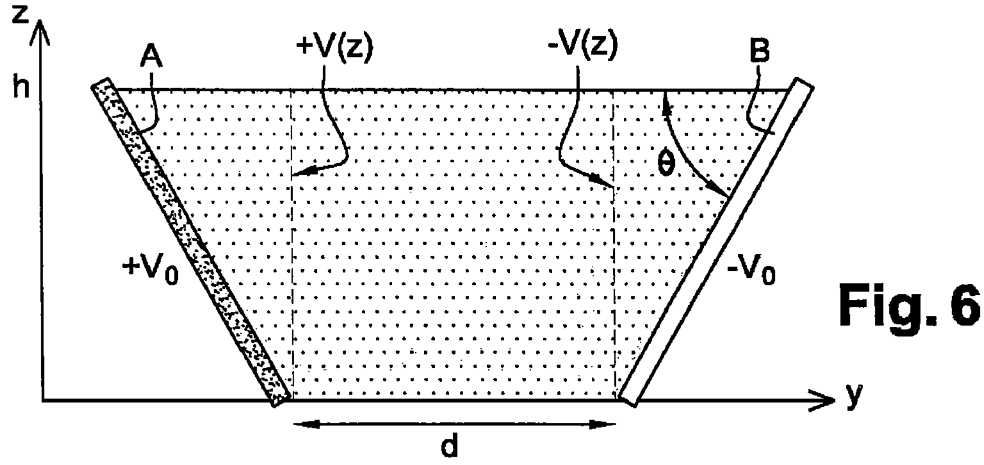
FIG. 6 is a schematic view showing the invention with the inclined-electrode configuration according to the invention.

This particular configuration referred to as "bevelled electrodes" is equivalent to the configuration obtained with two opposite-facing planar electrodes that are inclined at angle θ relative to horizontal as shown in FIG. 6.

Regardless of the mode adopted in order to achieve such a configuration, i.e. whether one uses non-planar electrodes or planar but inclined electrodes, the size of the electrodes along the oy axis corresponding to the thickness of the electrodes has no impact on the functionality of the device according to the invention.

Figure 7A:
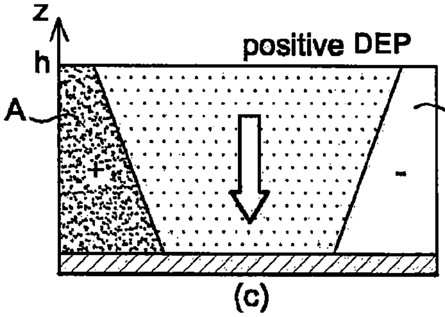
FIGS. 7*a*, 7*b* and 7*c* show the possibility of collection on a defined surface depending on the dielectrophoresis regime used, positive and negative mode respectively, using the bevelled-electrode configuration according to the invention.
Figure 7B:
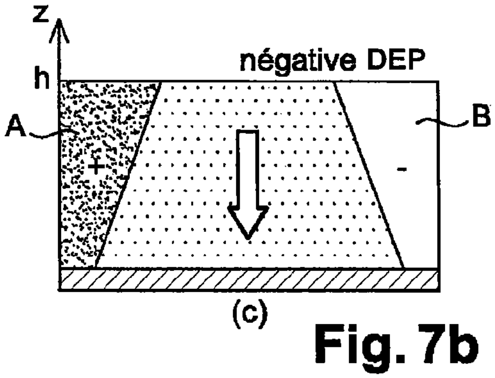
Figure 7C:
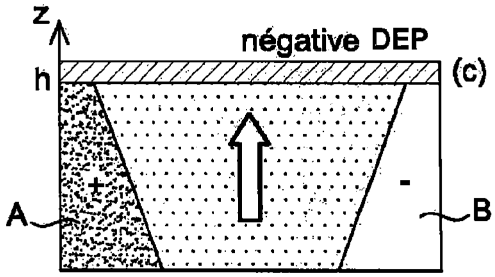

At the same time, the transition from a positive dielectrophoresis regime to a negative dielectrophoresis regime can be compensated either by reversing the inclination of the electrodes (FIG. 7*b*) or by moving collecting surface C onto the upper part of the component, as shown in FIG. 7*c*.

In FIG. 7*a*, a positive dielectrophoresis regime is used with the bevelled-electrode configuration of the type previously described and increasing variation of potential V as a function of oz.

In contrast, a negative dielectrophoresis regime is used in FIGS. 7*b* and 7*c*, by reversing the profile of the electrodes in order to obtain decreasing variation of potential as a function of oz, and by positioning the collecting surface at a higher level in the chamber for storing or moving the liquid to be treated and preserving increasing variation of the potential with the oz axis, respectively.

Insulated-Electrode Configuration

Figure 8:
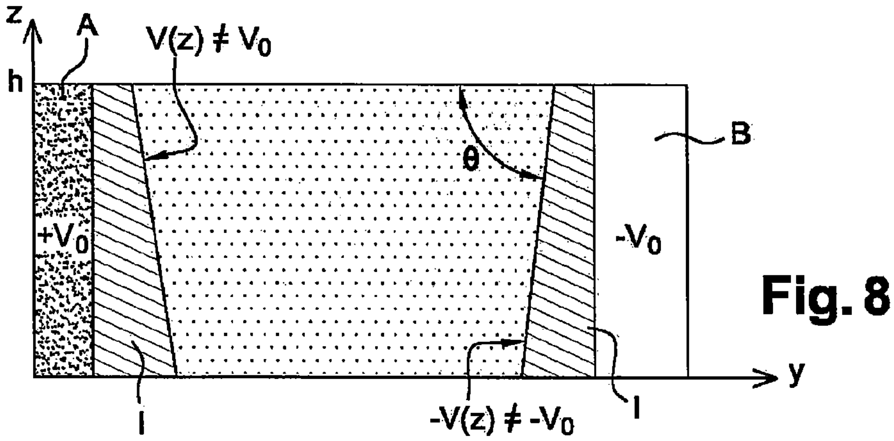
FIG. 8 is a schematic view showing the invention with the insulated-electrode configuration according to the invention.

In order to achieve variation of potential V(z) along the oz axis, the invention proposes a second so-called "insulated electrode" embodiment that is described, more especially, in relation to FIG. 8. In this configuration, the sets of electrodes A and B each comprise a single conductor supplied with potential having a peak value $V_0$, the surface of each of the conductors facing the fluid being covered by a layer made of an electrically insulating material 1. This layer of insulating material is deposited in such a manner that the surface of said insulator which is in contact with the fluid is inclined at angle θ relative to the horizontal. In other words, this amounts to varying the thickness of the insulating layer along the oz axis.

The invention consists of altering the thickness of the insulation layer in order to create a variable potential V(z) along the electrode and along the oz axis. In this configuration, the actual electrode itself has a surface parallel to direction oz and it is the insulation that has a thickness which varies with z which creates the non-constant function V(z).

The conditions that must be met for the value of angle θ are identical to those described in relation to the configuration with bevelled or inclined electrodes.

Consequently, the conditions in order to counterbalance any transition from a positive dielectrophoresis regime to a negative dielectrophoresis regime are also identical to those indicated previously.

The nature of the insulating material is not predefined. It must be chosen so as to ensure satisfactory mechanical adhesion to the electrode, highly homogeneous impermeability to electric charges and mechanical properties that make it easily machineable.

The use of insulated electrodes can provide a very marked improvement in the performance of a dielectrophoresis system. As already stated, the presence of electric fields in conductive fluids may cause transfer of electric charges on the electrodes that are capable of generating electrochemical reactions. These electrochemical reactions on the electrodes are factors that limit the effectiveness of separation because they generally cause release of gases that rapidly impair the electrical performance of the component. The intensities of electric fields applied are mainly limited by these electrochemical effects. If the intensity of the applied electric fields is increased, the intensity of the resulting dielectrophoretic forces is also increased, thereby optimising the efficiency of the component.

In fact, the insulating layer prevents the electric charges from passing between the fluid and the electrode in question. Because of this it limits the occurrence of electrochemical reactions on the electrodes and makes it possible to work with electric field levels (i.e. levels of applied potential $V_0$) that are higher than those obtained using non-insulated electrodes. The increase in the intensity of the electric field results in more intense dielectrophoretic forces. The performance of devices that use such insulated electrodes are better, regardless of their geometrical configuration.

Stacked-Electrode Configuration

Figure 9:
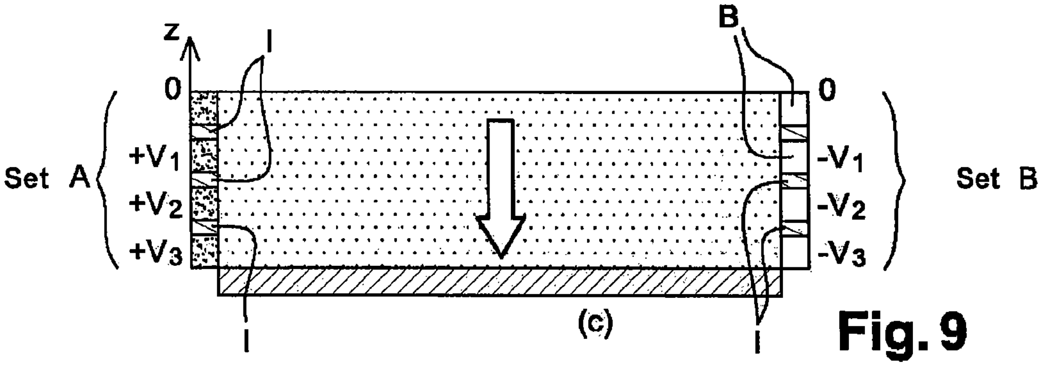
FIG. 9 is a schematic view showing the invention with the stacked-electrode configuration according to the invention.
Figure 10A:
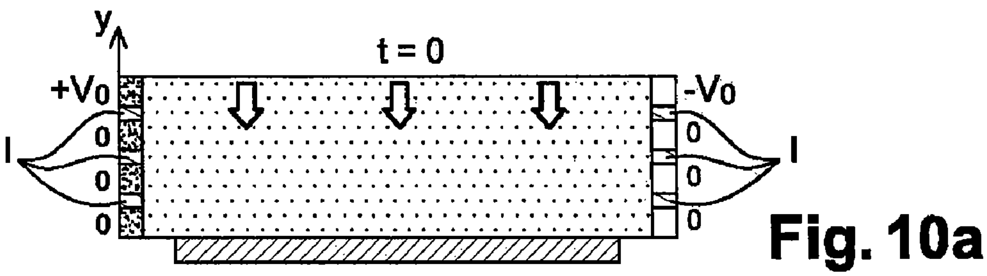
FIGS. 10*a*, 10*b*, 10*c* and 10*d* illustrate the principle used to operate the stacked-electrode configuration with spatial and time variation of potential V.
Figure 10B:
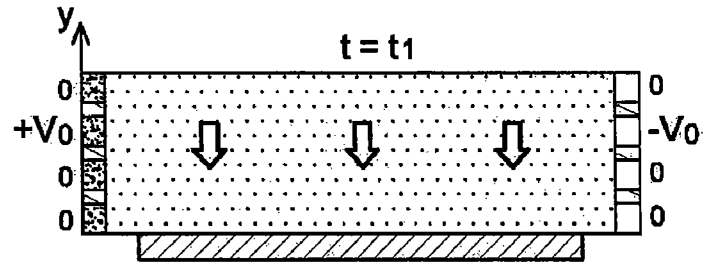
Figure 10C:
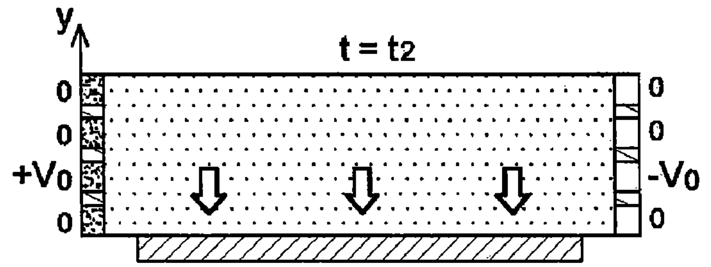
Figure 10D:
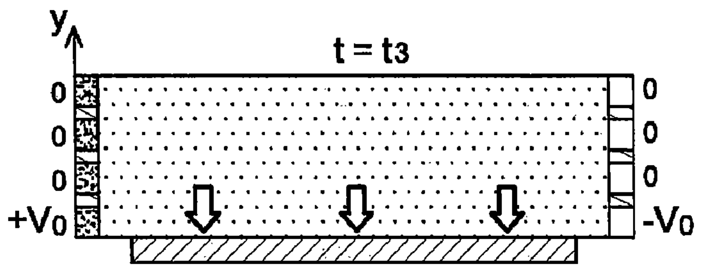

In order to obtain variation of potential V(z) along the oz axis, the invention proposes a third so-called "stacked-electrode" embodiment that is illustrated in FIGS. 9 and 10. With this configuration, each set of electrodes A and B consists of a stack of electrodes supplied by an electrical signal individually and separated by an insulating material.

The number of stacked electrodes N in each set and their dimension along oz are not fixed. Each set must have at least two electrodes and the sought-after performance of the component improves as their number N increases. The values of the potentials Vi applied to each electrode positioned at coordinate zi determines the overall function V(z) so that:

$$V(z) = \sum_{i=1,N} V_i(z_i)$$

The shape of function V(z) may be polynomial in z:

$$V(z) = \sum_{i=1,N} V_i(z_i) = a_n z^n + a_{n-1} z^{n-1} + \ldots + a_1 z + a_0$$

where n is the order of the polynome.

However, any other shape can be envisaged as long as it is a function of coordinate z (exponential, logarithmic, etc.).

As already stated, one can adjust the value of potentials $V_i$ in order, if applicable, to reverse the direction of variation of function V(z) in case of reversal of the dielectrophoresis regime.

The configuration with stacked electrodes can be used either by simultaneously applying, to each of the two sets of electrodes A and B, a different potential ($V_1$, $V_2$, $V_3$) to each electrode (spatial variation of potential) or by applying a (constant or non-constant) potential to each electrode sequentially (time variation of potential). With this second alternative (FIGS. 10*a* to 10*d*)), the electrodes are "switched on" consecutively one after the other, i.e. they are brought to the potential consecutively, thereby inducing a spatial-temporal potential gradient and a dielectrophoretic force which, over time, moves towards the capture surface, thus producing a piston effect on the particles.

Figure 11A:
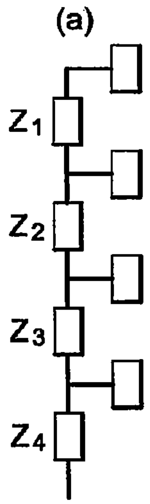
FIGS. 11*a*, 11*b* and 11*c* schematically show various electrical circuits capable of allowing operation of electrodes in a stacked configuration.
Figure 11B:
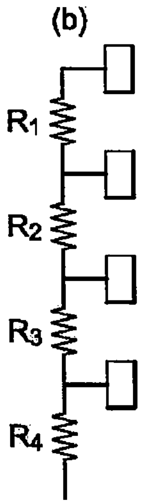
Figure 11C:
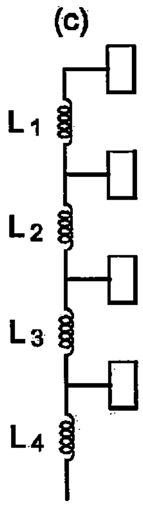

One simple possibility of supplying each electrode of each set differently (in space and time) is indicated in the circuit diagram shown in relation to FIGS. 11*a*, 11*b* and 11*c*.

In the circuit diagram in FIG. 11*a*, an impedance $Z_i$ consisting of combined resistance-inductance $R_iL_i$ is placed across the terminals of each electrode.

For example, a configuration without any phase difference is obtained using the circuit diagram in FIG. 11*b* that exclusively uses a resistor, thereby causing spatial variation of potential V. With the circuit diagram in FIG. 11*c*, which uses inductors, one obtains spatial and time variation of potential V, with the inductor causing delay.

Checker-Board Electrode Configuration

Figure 12A:
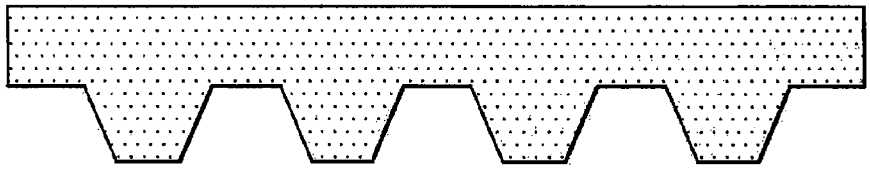
FIGS. 12*a* and 12*b* illustrate a configuration of the invention in checker-board mode, cross-sectional and top view respectively.
Figure 12B:
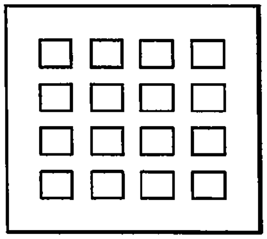

The various configurations described above can make it possible to create a component with a checker-board structure. This component consists of an assembly of several pyramidal components of the type described above—their number is not fixed. The fluid and the particles are arranged above the component. FIGS. 12*a* and 12*b* show a cross-sectional view and top view respectively of a checker-board pyramidal structure obtained using a bevelled-electrode configuration.

In the context of the invention's applications for molecular analyses, it is necessary to be able to detect one or more particular molecules that might be present among other molecules. The component with a checker-board structure can be adapted to the microwell plates already used for this type of application. These plates have micro-pits, generally distributed in an array. The flanks of the pits can constitute the support for the electrodes used in accordance with the invention. Each well consists of an elementary pyramidal component and acts as a contact capable of chemically differentiating a sought-after molecule by the very nature of the capture surface positioned in the bottom of the well. Individual addressing (switching on) of each contact involves applying an electric potential to each set of electrodes. Simultaneous or sequential switching on of the wells makes it possible to encourage the capture of molecules by dielectrophoresis. The chief attraction of this particular configuration is that it echoes the operation of a planar system whilst separating electric surfaces from capture surfaces.

Regardless of the configuration chosen, it has been shown that collection is improved if one uses an insulating base as the collecting surface. In fact, it has been demonstrated that, with such a collecting surface, one avoids the concentration of collected particles on the electrodes, i.e. at the level of the location where the electric field is most intense. The insulating base then acts as a catching or confinement area and is no longer in contact with the electrodes.

In one version of the invention, this insulating base is replaced by a base made of a conductive material, electrically insulated from the electrodes, and connected, for example, to ground or polarised.

Practical experience demonstrates that collection of particles occurs at the level of the centre of said base rather than on the edges, as in the previous case when using an insulating base.

This embodiment has a certain number of advantages including:

- the confinement of particles in a less confined area thus allowing faster rediffusion of particles;
- the greater ease with which biological capture contacts can be grafted because of the central position relative to the centreline of the flow channel containing said particles;
- the greater ease with which optical reading can be performed, for example by fluorescence, because the signal is diffracted less by the edges of the flow channel and by reducing vignetting phenomena resulting from the blocking of light beams by the same walls.

Because the substrate must be conductive, it advantageously has a layer made of gold, silver, platinum, aluminium or chrome. In order to also make it transparent, it can be made of ITO (the generic term that designates oxides of indium) or of polyaniline.

Detection can thus be performed optically, especially by fluorescence, regardless whether the base is transparent or not. In the latter case, one excites fluorescence via surface plasmon. Detection may also be performed using surface plasmon resonance. It may also be performed electrically by using the base as an active electrode during a read operation.

All the benefits of the device according to the present invention are readily apparent to the extent that, fundamentally and primarily, it makes it possible to define a field of dielectrophoretic forces that extends throughout the entire volume of the fluid, something which was impossible to achieve using devices according to the prior art.

Also, it makes it possible to operate with a positive dielectrophoresis regime or a negative dielectrophoresis regime, thus optimising the number of particle-fluid pairs capable of being treated and offering the operator a wider range of operating frequencies.

The invention claimed is:

1. A device for dielectrophoretic separation of particles contained in a fluid, comprising two sets of electrodes, each of the two sets of electrodes being brought to a different potential, so as to generate an electric field inside said fluid, the two sets of electrodes being positioned inside a chamber or pipe accommodating the fluid that is subjected to dielectrophoretic separation, said chamber or pipe including a dielectrophoretically separated particle collecting surface separate from the two sets of electrodes, wherein:

- each of the two sets of electrodes is immersed in the fluid inside the chamber or pipe and is located in a plane perpendicular to a plane of the separated particle collecting surface;
- the two sets of electrodes are supplied with electric current in phase opposition;
- when energized for dielectrophoretic separation, each of the two sets of electrodes produces, in the fluid, a potential having a gradient based on distance along a direction perpendicular to the plane of the separated particle collecting surface, and a resulting dielectrophoretic force oriented in said direction that simultaneously dielectrophoretically separates the particles from the fluid and propels the separated particles to the collecting surface; and
- the two sets each comprise a plurality of electrodes stacked one on top of another in the direction perpendicular to the plane of the particle collecting surface, said electrodes being separated, two by two, by an electric insulator and said electrodes of each of the sets being subjected to spatial variation of the potential applied to the electrodes in the direction perpendicular to the plane of the particle collecting surface to produce said potential having a gradient and said resulting dielectrophoretic force.

2. A device for dielectrophoretic separation of particles contained in a fluid comprising two sets of non-particle collecting electrodes, each of the two sets of electrodes being brought to a different potential, so as to generate an electric field inside said fluid, the two sets of electrodes being positioned inside a chamber or pipe accommodating the fluid that is subjected to dielectrophoretic separation, said chamber or pipe including a separated particle collecting area separate from the two sets of electrodes, wherein:

- each of the two sets of electrodes is immersed in the fluid inside the chamber or pipe and is located in a plane different from a plane of the particle collecting area;
- the two sets of electrodes are supplied with electric current in phase opposition;
- and, when energized for dielectrophoretic separation, each of the two sets of electrodes produces an electric field inside said fluid having a gradient based on distance along a direction perpendicular to the plane of the particle collecting area and a resulting dielectrophoretic force oriented along said direction that simultaneously dielectrophoretically separates the particles from the fluid and propels the separated particles to the collecting area and not to the electrodes; and the two sets of electrodes have a pyramidal configuration in which distance between opposed surfaces of the two sets varies along said direction, to produce said potential having a gradient and said resulting dielectrophoretic force.

3. A device for dielectrophoretic separation of particles contained in, comprising two sets of electrodes, each of the two sets of electrodes being brought to a different potential, so as to generate an electric field inside said fluid, the two sets of electrodes being positioned inside a chamber or pipe accommodating the fluid that is subjected to dielectrophoretic separation, said chamber or pipe including a dielectrophoretically separated particle collecting surface separate from the two sets of electrodes, wherein:

each of the two sets of electrodes is immersed in the fluid inside the chamber or pipe and is located in a plane perpendicular to a plane of the separated particle collecting surface;

the two sets of electrodes are supplied with electric current in phase opposition;

when energized for dielectrophoretic separation, each of the two sets of electrodes produces, in the fluid, a potential having a gradient based on distance along a direction perpendicular to the plane of the separated particle collecting surface, and a resulting dielectrophoretic force oriented in said direction that simultaneously dielectrophoretically separates the particles from the fluid and propels the separated particles to the collecting surface; and wherein the two sets each comprise a plurality of electrodes stacked one on top of another in the direction perpendicular to the particle collecting surface, said electrodes being separated, two by two, by an electric insulator and said electrodes of each of the sets being subjected to sequential and time variation of a constant or non-constant potential that is applied to the electrodes to produce said potential having a gradient and said resulting dielectrophoretic force.

4. A device for dielectrophoretic separation of particles contained in a fluid as claimed in claim 3, wherein the electrodes of each of the sets are consecutively brought to a determined potential in the direction perpendicular to the plane of the particle collecting surface so as to produce a spatial-temporal gradient of the potential and, the resulting dielectrophoretic force.

5. A device for dielectrophoretic separation of particles contained in a fluid, comprising two insulated electrodes, each of the two insulated electrodes being brought to a different potential, so as to generate an electric field inside said fluid, the two insulated electrodes being positioned inside a chamber or pipe accommodating the fluid that is subjected to dielectrophoretic separation, said chamber or pipe including a dielectrophoretically separated particle collecting surface separate from the two insulated electrodes, wherein:

each of the two insulated electrodes is immersed in the fluid inside the chamber or pipe and is located in a plane different from a plane of the separated particular collecting surface;

the two sets of electrodes are supplied with electric current in phase opposition;

and, when energized for dielectrophoretic separation, each of the two insulated electrodes produces, in the fluid, a potential having a gradient based on distance along a direction perpendicular to the plane of the separated particle collecting surface, and a resulting dielectrophoretic force oriented in said direction that simultaneously dielectrically separates the particles from the fluid and propels separated particles to the collecting surface;

and each of the two insulating electrodes comprises a conductor covered by a layer of electrically insulating material of varying thickness to form a pyramidal configuration in which distance between opposed surfaces of insulating layers of the two insulated electrodes varies along said direction, to produce said potential having a gradient and said resulting dielectrophoretic force.

6. A device for dielectrophoretic separation of particles contained in a fluid as claimed in claim 5, wherein each conductor has a surface facing the fluid perpendicular to the plane of the particle collecting surface and the surface of the conductor facing the fluid is covered by the layer of electrically insulating material, having a thickness that increases or decreases in the direction perpendicular to the plane of the particle collecting surface to form said pyramidal configuration.

7. A device for dielectrophoretic separation of particles contained in a fluid comprising two sets of electrodes, each of the two sets of electrodes being brought to a different potential, so as to generate an electric field inside said fluid, the two sets of electrodes being positioned inside a chamber or pipe accommodating the fluid that is subjected to dielectrophoretic separation, said chamber or pipe including a dielectrophoretically separated particle collecting surface separate from the two sets of electrodes, wherein:

each of the two sets of electrodes is immersed in the fluid inside the chamber or pipe and is located in a plane different from a plane of the separated particle collecting surface;

the two sets of electrodes are supplied with electric current in phase opposition;

and, when energized for dielectrophoretic separation, each of the two sets of electrodes produces, in the fluid, a potential having a gradient based on distance along a direction perpendicular to the plane of the separated particle collecting surface, and a resulting dielectrophoretic force oriented in said direction that simultaneously dielectrophoretically separates the particles from the fluid and propels the separated particles to the collecting surface;

and the two sets of electrodes have a pyramidal configuration in which distance between opposed surfaces of the two sets varies along said direction, to produce said potential having a gradient and said resulting dielectrophoretic force.

8. A device for dielectrophoretic separation of particles contained in a fluid as claimed in claim 7, wherein each of the electrodes that constitute the sets has a rectangular trapezoidal longitudinal cross-section, an inclined surface of which is in contact with the fluid and forms said pyramidal configuration.

9. The device for dielectrophoretic separation of particles contained in a fluid according to claim 7, wherein an electrical field gradient produced by the two sets of electrodes, during the dielectrophoretic separation, does not intersect the sets of electrodes.

10. The device for dielectrophoretic separation of particles contained in a fluid according to claim 7, wherein the collecting surface comprises an insulating base.

11. A device for dielectrophoretic separation of particles contained in a fluid as claimed in claim 7, wherein the two sets of electrodes each comprise a single electrode supplied with a potential having a peak value $V_0$ and a surface of each of said electrodes which is in contact with the fluid to be treated has an inclined profile relative to horizontal and relative to each other to form said pyramidal configuration.

12. A device for dielectrophoretic separation of particles contained in a fluid as claimed in claim 11, wherein each of the electrodes that constitute the sets has a rectangular longitudinal cross-section.

13. The device for dielectrophoretic separation of particles contained in a fluid according to claim 7, wherein the collecting surface comprises a conductive base electrically insulated from said electrodes.

14. The device for dielectrophoretic separation of particles contained in a fluid according to claim 13, wherein the conductive base is transparent.

15. An assembly for performing dielectrophoretic separation of particles contained in a fluid, comprising a plurality of the devices as claimed in claim 7.

16. The assembly according to claim 15, wherein said plurality of devices are arranged side-by-side in a checkerboard configuration.

* * * * *